United States Patent [19]

Silhan

[11] Patent Number: 4,971,286

[45] Date of Patent: Nov. 20, 1990

[54] SUPPORTIVE FRAMEWORK

[76] Inventor: Mark A. Silhan, 712 Harold Ave., Salina, Kans. 67401

[21] Appl. No.: 405,563

[22] Filed: Sep. 8, 1989

[51] Int. Cl.⁵ ............................................. F16M 3/00
[52] U.S. Cl. ....................................... 248/676; 248/129
[58] Field of Search ............ 248/676, 678, 129, 145.6, 248/146, 176, 637, 671, 672, 673, 544; 269/70

[56] References Cited

U.S. PATENT DOCUMENTS

| | | | |
|---|---|---|---|
| 1,380,123 | 5/1921 | Sullivan | 248/678 X |
| 1,564,131 | 12/1925 | Dunlap | 248/678 |
| 1,750,199 | 3/1930 | Spahn | 248/676 X |
| 2,885,165 | 5/1959 | Smolen | 248/671 |
| 3,188,109 | 6/1965 | Broadrick | 248/129 X |
| 4,033,531 | 7/1977 | Levine | 248/676 X |
| 4,191,356 | 3/1980 | Ashmun et al. | 248/678 |
| 4,412,774 | 11/1983 | Legrand et al. | 248/671 X |
| 4,511,112 | 4/1985 | Ruehle | 248/676 X |

*Primary Examiner*—Ramon O. Ramirez
*Attorney, Agent, or Firm*—Litman, McMahon & Brown

[57] ABSTRACT

A supportive framework for an object is provided which includes a pair of frame halves. Each frame half includes a frame body with a U-shaped configuration formed by a base leg, a first end leg and a second end leg. A connecting leg assembly extends from the base leg between the end legs and is adapted for mounting an object, such as an engine. Handle assemblies are mounted on the frame end legs for lifting, carrying, guiding and pushing the framework. Wheel assemblies are mounted on the frame bodies for rolling the framework.

12 Claims, 1 Drawing Sheet

U.S. Patent     Nov. 20, 1990     4,971,286
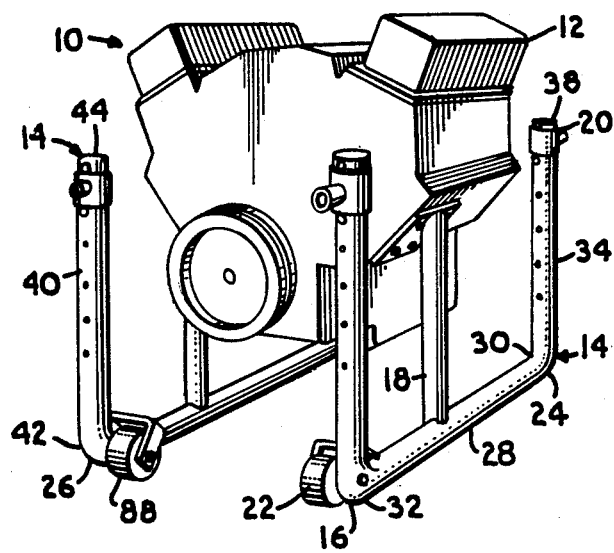
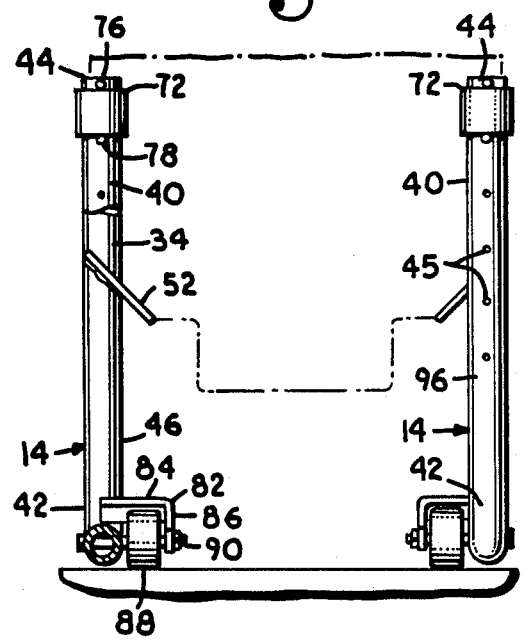
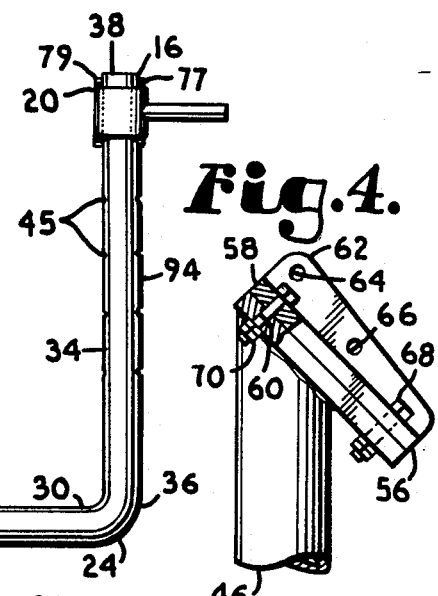
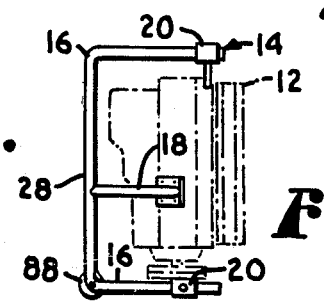

SUPPORTIVE FRAMEWORK

BACKGROUND OF THE INVENTION

1. Field of the Invention.

The present invention relates generally to supportive frameworks, and more particularly to internal combustion engine stands and transporting devices.

2. Description of the Relevant Art.

Supportive frameworks have heretofore been proposed for supporting various objects in elevated positions for assembly, servicing, transporting, storing, displaying and other purposes. For example, internal combustion engines are often removed from their permanent installations for overhaul and replacement. Hoists, jacks and lifts are commonly used in the trade for removing and installing relatively heavy vehicle components, such as engines and transmissions. Such components, when separated from their permanent installations, may be too heavy, awkward or cumbersome for one person to handle. Therefore, dollies, hand trucks, carts and similar devices are often employed by service facilities to support and transport engines, transmissions and other relatively heavy vehicle components.

Many such service facilities also employ engine stands which support engines in various positions for servicing.

Many vehicle and engine assembly plants have sophisticated and specialized equipment for handling components. However, such equipment may be unsuitable for service facilities which require such capabilities infrequently or which deal with a variety of components, e.g. engines for various vehicle models, and thus require greater flexibility and adaptability. Furthermore, individuals who occasionally work on vehicles have greater need for a supporting and transporting device that is adaptable to various engines and that requires relatively little storage space.

Previous engine stands and transport devices for engines have tended to be complicated, expensive, cumbersome to store, limited in their applications and otherwise not particularly well suited to accomplish the objectives of the present invention. Heretofore there has not been a supportive frame for vehicle components and other objects with the advantages and features of the present invention.

SUMMARY OF THE INVENTION

In the practice of the present invention, a supportive frame is provided for an object such as an internal combustion engine. The supportive frame comprises a pair of frame halves. Each frame half includes a U-shaped frame body with base, first end and second end legs. A connecting assembly extends from the base in substantially parallel relation to the end legs and includes a connecting plate for attachment to one side of an engine supported by the frame. Handle assemblies are pivotally mounted on ends of the end legs for carrying the frame with an object mounted thereon and for raising one end of the frame to a wheel transport position for rolling on a pair of wheel assemblies mounted on ends of the frame bodies.

OBJECTS AND ADVANTAGES OF THE INVENTION

The objects and advantages of the present invention include: providing a supportive frame for various objects; providing such a supportive frame which is particularly well adapted for vehicle components such as engines and transmissions; providing such a supportive frame which can be carried with a supported object; providing such a supportive frame which can be rolled with a supported object; providing such a supportive frame which can be stored relatively compactly; providing such a supportive frame which comprises separable frame halves for relatively compact storing and shipping; and providing such a supportive frame which is efficient in operation, economical to manufacture, capable of a long operating life, adaptable for various objects, adapted for placement in various positions and orientations, and is particularly well adapted for the proposed usages thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top, front, left side view of a supportive framework embodying the present invention, with an engine mounted thereon.

FIG. 2 is an enlarged, front or first end elevational view of the supportive framework.

FIG. 3 is a left side elevational view of the supportive framework.

FIG. 4 is a fragmentary, enlarged, elevational view of the framework, particularly showing an optional adapter bracket therefor.

FIG. 5 is a side elevational view of the supportive framework in a wheel transport position.

FIG. 6 is a side elevational view of the supportive framework in an on-end storage position.

DETAILED DESCRIPTION OF THE PREFERRED EMBODIMENTS

I. Introduction and Environment.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. Said terminology will include the words specifically mentioned, derivatives thereof and words of similar import.

Referring to the drawings in more detail, the reference numeral 10 generally designates a supportive frame for an object, such as a vehicle engine 12. Although the frame 10 is particularly well adapted for supporting vehicle engines, both with and without attached transmissions, such objects are only exemplary and a wide range of other objects could be effectively supported by the frame 10.

The supportive frame 10 generally comprises a pair of frame halves 14 which can be substantially identical to each other except for their reverse, mirror-image configurations. Each frame half 14 generally comprises: a frame body 16 (Section II); a connecting leg assembly 18 (Section III); a pair of handle assemblies 20 (Section IV); and a wheel assembly (Section V).

II. Frame Body 16.

The frame body 16 can comprise a continuous length of steel pipe or tubing bent at first and second ninety degree corners 24, 26 to form: a base leg 28 with proximate and distal ends 30, 32; a first end leg 34 with proximate and distal ends 36, 38; and a second end leg 40 with proximate and distal ends 42, 44. Each end leg 34, 40 includes multiple, vertically-spaced, diametrically-opposed pairs of receivers 45.

The body 16 thus has a generally U-shaped configuration, with the base leg first end 30 and the first end leg proximate end 36 intersecting at the first corner 24, and the base leg second end 32 intersecting the second end leg proximate end 42 at the second corner 26. Although the frame body 16 could be manufactured to various dimensions, base leg 28 lengths in the range of about thirty inches to forty-two inches and end leg 30, 32 lengths in the range of about eighteen inches to thirty inches have been found to be satisfactory for at least some vehicle engines.

III. Connecting Leg Assembly 18.

The connecting leg assembly 18 includes a connecting leg 46 with a proximate end 48 connected to the base leg 28 intermediate its ends 30, 32 and a distal end 50 which forms an acute angle with respect to the longitudinal axis of the connecting leg 46 in the range of about thirty degrees to about sixty degrees. The connecting leg distal end 50 mounts a connecting plate 52 with bolt holes 54 corresponding in placement to the mounting bolt hole patterns of various engines, such as that shown at 12.

An adapter bracket 56 (FIG. 4) is provided for mounting the frame 10 on engines with appropriate mounting connections, e.g. Chrysler engines. The adapter bracket 56 includes an adapter plate 58 with bolt holes 60 in a pattern adapted for alignment with the connecting plate bolt holes 54. The adapter bracket 56 also includes an adapter clevis 62 with first and second transversely aligned engine mounting bolt receivers 64, 66 with spacings corresponding to the spacings of the mounting bolts on a Chrysler engine. The aligned bolt holes 54, 60 can receive adapter bracket mounting bolts 68 which threadably receive nuts 70. Alternatively, the adapter plate bolt holes 60 could be threaded for threadably receiving the adapter bracket mounting bolts 68.

IV. Handle Assembly 20.

A pair of handle assemblies 20 are mounted on the end leg distal ends 38, 44 of each frame half 14. Each handle assembly 20 includes a sleeve 72 and a handle 74 projecting laterally from the sleeve 72. The sleeve 72 is rotatably captured between upper and lower retainers 76, 78 comprising bolts 77 selectively received in aligned pairs of receivers 45 and threadably receiving nuts 79. The heights of the handle assemblies 20 can be adjusted by repositioning the upper and lower retainers 76, 78 in different pairs of receivers 45 whereby persons of different heights can position the handle assemblies 20 at comfortable and convenient heights. Alternatively, the retainers 76, 78 could comprise plates, collars or other mechanical stops attached (either movably or fixedly) to the end legs 34, 40.

V. Wheel Assembly 22

Each wheel assembly 22 includes a gusset 80 secured to the base and second legs 28, 40 on the inside of a respective second corner 26. An angle-section wheel mounting bracket 82 extends inwardly from the gusset 80 and includes an upper section 84 which extends generally horizontally from the gusset 80, and a lower section 86 which extends downwardly and outwardly from the upper section 84. A wheel 88 is rotatably journaled between the frame body 16 and the wheel mounting bracket lower section 86 on an axle 90 which extends through the body 16 at the second corner 26 and through the wheel mounting bracket lower section 86.

VI. Operation.

In operation, the supportive frame 10 is adapted for supporting an object, such as an engine 12, in various orientations, including both moving and stationary positions. The frame halves 14 can be secured to the sides of the engine 12 by, for example, placing mounting bolts in the connecting plate bolt holes 54, which can be aligned with bolt holes in a corresponding pattern on an engine side mounting plate or assembly. For an engine such as that shown at 12, the frame halves 14 would be placed so that the connecting plates 52 slope downwardly and inwardly, and the wheel assemblies 22 are on the inside. For a Chrysler engine, the adapter brackets 56 can be utilized.

The supportive frame 10 can function as an engine stand with any corresponding pair of legs 28, 34 or 40 resting on a floor or ground surface 92. Thus, with the base legs 28 down (FIG. 1) the engine 12 can be supported in a normal, upright position. With either the first end legs 34 or the second end legs 40 (FIG. 6) down, the engine 12 can effectively be stood on one of its ends or the other. Conceivably the engine 12 could be turned upside down by providing extensions on the end leg distal ends 38, 44, or by supporting such leg ends on other support structures (not shown) above the ground or floor surface 92. Convenient access can thus be had to the various parts of the engine 12 for service, repairs and related activities.

For rolling transport (FIG. 5), a person can grasp the handles 74 at a frame first end 94, raise the frame first end 94 and thus rollably engage the ground or floor surface 92 with the wheels 88. For carrying transport, one person can grip the handle 74 at the frame first end and a second person can grip the handle 74 at the frame second end 96. The frame 10 and the object supported thereon can thus be easily carried by two persons. The relative openess (i.e. absence of cross-members) of the frame ends 94, 96 cooperate with the placement of the engine 12 to facilitate walking since a person's legs can swing into the frame ends 94, 96.

The relative openess of the frame ends 94, 96 also permits relatively long objects to be supported by the frame 10. For example, an engine can be mounted to the frame 10 with a transmission attached and extending from one or the other end 94, 96 between a respective pair of end legs 34 or 40. Thus, engines 10 and transmissions can be transported, stored, serviced, etc. as individual units.

The configuration of the frame 10 facilitates space saving. In particular, with the engine 10 mounted, the frame 10 can be stood on one of its ends 94, 96 to reduce the amount of floor space occupied in a vertical position from that which would be occupied in a horizontal position. The frame halves 14, since they are separable, can be compactly stored, displayed and shipped.

The swiveling or rotating feature of the handle assemblies 20 further facilitates storage of the frame 20, both with and without the engine 12 attached, in various positions. In particular, the handles 74 can be turned inwardly to reduce the overall length of the frame 10, and also when the respective legs 34, 40 that they are mounted on are placed flat against the ground or floor surface 92.

It is to be understood that while certain forms of the present invention have been illustrated and described herein, it is not to be limited to the specific forms or arrangement of parts described and shown.

What is claimed and desired to be secured by Letters Patent is as follows:

1. A supportive framework for an object, which comprises:
   (a) a pair of frame halves each including:
      (1) an elongated base leg with first and second ends;
      (2) a first end leg with a proximate end connected to said base leg first end and a distal end;
      (3) a second end leg with a proximate end connected to said base leg second end and a distal end;
   (b) connecting means adapted for connecting said frame halves to an object;
   (c) said connecting means comprising a pair of middle legs each extending from a respective base leg in parallel, spaced relation between respective first and second legs, and each including a proximate end connected to said base leg and a distal end; and
   (d) a connecting plate with a sloping orientation mounted on each middle leg distal end.

2. The supportive frame according to claim 1, which includes:
   (a) wheel means mounted on said base legs.

3. The supportive frame according to claim 2 wherein:
   (a) said wheel means comprises a pair of wheels each mounted at a respective intersection formed by a respective base leg second end and a second leg proximate end.

4. The supportive frame according to claim 1, which includes:
   (a) handle means connected to said frame halves.

5. The supportive frame according to claim 4 wherein said handle means comprises:
   (a) a pair of handle each connected to a respective first end leg distal end.

6. The supportive frame according to claim 5 wherein:
   (a) each said first end leg distal end has a generally circular cross-sectional configuration; and
   (b) each said handle assembly includes a generally tubular sleeve rotatably receiving said first end leg distal end and a handle projecting laterally from said sleeve.

7. The supportive frame according to claim 5, which includes:
   (a) said handle assembly pair comprising a first handle assembly pair; and
   (b) a second handle assembly pair mounted on said second end leg distal ends.

8. A supportive frame for an engine including a pair of engine mounts positioned on opposite sides of the engine, which comprises a pair of frame halves each including:
   (a) a U-shaped, tubular frame body including:
      (1) a base leg with first and second ends;
      (2) a first end leg with a proximate end attached to the base leg first end and a distal end; and
      (3) a second end leg having a proximate end attached to the base leg second end and a distal end;
   (b) a connecting assembly including:
      (1) a connecting leg extending in parallel, spaced relation from said base leg intermediate said first and second end legs and including a proximate end attached to said base leg and a distal end; and
      (2) a connecting plate mounted on said connecting leg distal end at a sloping orientation, said connecting plate being adapted for connecting to said motor mount;
   (c) first and second handle assemblies each including:
      (1) a sleeve rotatably receiving a respective end leg distal end;
      (2) a handle projecting laterally from said sleeve; and
      (3) proximate and distal collars mounted on said end legs with said sleeve rotatably positioned therebetween; and
   (d) a wheel assembly including:
      (1) a wheel mounting bracket mounted on said frame body at the intersection of said base leg second end and said second end leg proximate end;
      (2) an axle bolt extending through said frame body at the intersection of said base leg second end and said second end leg proximate end and through said mounting bracket; and
      (3) a wheel rotatably receiving said axle bolt.

9. The supportive frame according to claim 8 wherein each said frame half includes:
   (a) an adapter bracket comprising a plate adapted for mounting on said connecting plate and a clevis projecting outwardly from said plate.

10. A supportive framework for an object, which comprises:
    (a) a pair of frame halves each including:
       (1) an elongated base leg with first and second ends;
       (2) a first end leg with a proximate end connected to said base leg first end and a distal end;
       (3) a second end leg with a proximate end connected to said base leg second end and a distal end;
    (b) connecting means adapted for connecting said frame halves to an object;
    (c) a pair of handle assemblies each connected to a respective first end leg distal end and each including a generally tubular sleeve rotatably receiving said first end leg distal end and a handle projecting fixedly attached to and projecting laterally from said sleeve; and
    (d) each said first leg distal end having a generally circular cross-sectional configuration.

11. The supportive frame according to claim 10 wherein:
    (a) said connecting means comprises a pair of middle legs each extending from a respective base leg in parallel, spaced relation between respective first and second legs, and each including a proximate end connected to said base leg and a distal end; and
    (b) a connecting plate mounted on each middle leg distal end.

12. The supportive frame according to claim 11 wherein:
    (a) said connecting plates have sloping orientations.

* * * * *